(12) United States Patent
Kemp et al.

(10) Patent No.: US 7,636,757 B2
(45) Date of Patent: Dec. 22, 2009

(54) PRINTING OVER THE INTERNET

(75) Inventors: Devon James Kemp, Laguna Hills, CA (US); Donald Parke Gibson, Yorba Linda, CA (US); Hung Huang, Tustin, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 671 days.

(21) Appl. No.: 09/736,240

(22) Filed: Dec. 15, 2000

(65) Prior Publication Data

US 2002/0078160 A1 Jun. 20, 2002

(51) Int. Cl.
*G06F 15/16* (2006.01)
*G06F 3/12* (2006.01)

(52) U.S. Cl. ...................... 709/208; 358/1.15
(58) Field of Classification Search ................ 715/752, 715/805; 709/201–253; 707/526; 705/26; 358/1.15
See application file for complete search history.

(56) References Cited

U.S. PATENT DOCUMENTS

| | | | | |
|---|---|---|---|---|
| 5,467,434 A | * | 11/1995 | Hower et al. ............... | 358/1.15 |
| 5,544,320 A | | 8/1996 | Konrad ................... | 395/200.09 |
| 5,548,722 A | | 8/1996 | Jalalian et al. ........... | 395/200.1 |
| 5,615,015 A | | 3/1997 | Krist et al. .................. | 358/296 |
| 5,657,461 A | | 8/1997 | Harkins et al. .............. | 395/333 |
| 5,696,901 A | | 12/1997 | Konrad ................... | 395/200.09 |
| 5,699,494 A | | 12/1997 | Colbert et al. .............. | 395/114 |
| 5,727,135 A | | 3/1998 | Webb et al. ................. | 395/113 |
| 5,799,206 A | | 8/1998 | Kitagawa et al. ........... | 395/856 |
| 5,809,265 A | | 9/1998 | Blair et al. ................. | 395/339 |
| 5,813,348 A | | 9/1998 | Zingher ...................... | 101/494 |
| 5,867,633 A | | 2/1999 | Taylor, III et al. ........... | 395/109 |
| 5,867,636 A | | 2/1999 | Walker ....................... | 395/114 |
| 5,869,819 A | | 2/1999 | Knowles et al. ............. | 235/375 |
| 5,897,260 A | * | 4/1999 | Zingher ...................... | 400/719 |
| 5,933,144 A | | 8/1999 | Alcorn ........................ | 345/347 |
| 5,933,586 A | | 8/1999 | Lee ............................. | 95/115 |
| 5,974,444 A | | 10/1999 | Konrad ....................... | 709/203 |

(Continued)

FOREIGN PATENT DOCUMENTS

EP 0 782 068 7/1997

(Continued)

OTHER PUBLICATIONS

"Readme. txt", Kinko's File Prep Tool (tm), <http://www.kinkos.com>, (visited Nov. 21, 2000), 6 pages.

(Continued)

*Primary Examiner*—J Bret Dennison
(74) *Attorney, Agent, or Firm*—Fitzpatrick, Cella, Harper & Scinto

(57) ABSTRACT

Printing over the Internet by a print driver, accessible by at least one application program, so as to output print data for transmission over the Internet, by receiving a print request from an application program to print over the Internet, rendering print data to be transmitted over the Internet into a printing definition language, and packaging the rendered print data with a protocol for transmission over the Internet. The print driver further obtains service provider information, the service provider information representing at least one destination for which the print data can be transmitted to over the Internet. A graphical user interface may provide an interface for obtaining user information and service provider information.

23 Claims, 10 Drawing Sheets

U.S. PATENT DOCUMENTS

| | | | |
|---|---|---|---|
| 5,982,996 A | | 11/1999 | Snyders .................... 395/114 |
| 5,995,723 A | * | 11/1999 | Sperry et al. ............... 358/1.15 |
| 6,085,169 A | * | 7/2000 | Walker et al. ................ 705/26 |
| 6,160,631 A | | 12/2000 | Okimoto et al. |
| 6,185,611 B1 | * | 2/2001 | Waldo et al. ................ 709/221 |
| 6,201,611 B1 | | 3/2001 | Carter et al. ............... 358/1.15 |
| 6,327,045 B1 | * | 12/2001 | Teng et al. ................ 358/1.15 |
| 6,330,542 B1 | * | 12/2001 | Sevcik et al. .................... 705/8 |
| 6,335,795 B1 | * | 1/2002 | Neuhard et al. ........... 358/1.15 |
| 6,414,635 B1 | * | 7/2002 | Stewart et al. .............. 342/457 |
| 6,498,611 B1 | * | 12/2002 | Beard et al. ................. 715/752 |
| 6,504,620 B1 | * | 1/2003 | Kinjo ........................ 358/1.15 |
| 6,631,008 B2 | * | 10/2003 | Aoki ........................ 358/1.15 |
| 6,646,759 B1 | * | 11/2003 | Koga ......................... 358/1.9 |
| 6,714,964 B1 | * | 3/2004 | Stewart et al. .............. 709/203 |
| 6,757,729 B1 | | 6/2004 | Devarakonda et al. ...... 709/226 |
| 6,816,271 B1 | * | 11/2004 | Takahashi ................. 358/1.13 |
| 6,888,641 B2 | | 5/2005 | Koana |
| 6,978,299 B1 | * | 12/2005 | Lodwick .................... 709/223 |
| 6,980,964 B1 | * | 12/2005 | Cocotis et al. ................ 705/26 |
| 7,016,057 B1 | | 3/2006 | Maruyama |
| 7,042,585 B1 | * | 5/2006 | Whitmarsh et al. ........ 358/1.15 |
| 7,093,046 B2 | * | 8/2006 | Keeney et al. ............. 710/220 |
| 7,095,518 B1 | * | 8/2006 | Keeney et al. ............. 358/1.15 |
| 7,102,774 B2 | * | 9/2006 | White ....................... 358/1.15 |
| 7,206,090 B2 | * | 4/2007 | Seto .......................... 358/1.15 |
| 7,225,220 B2 | * | 5/2007 | Gonzalez et al. ............ 709/202 |
| 7,239,408 B1 | * | 7/2007 | Whitmarsh et al. ........ 358/1.15 |
| 7,242,490 B1 | * | 7/2007 | Palmer et al. .............. 358/1.15 |
| 7,330,816 B1 | | 2/2008 | Satomi et al. |
| 7,343,438 B2 | * | 3/2008 | Keeney et al. ............. 710/220 |
| 2001/0055492 A1 | * | 12/2001 | Wood et al. .................... 399/8 |
| 2002/0019757 A1 | * | 2/2002 | Dodt et al. ..................... 705/7 |
| 2002/0019786 A1 | * | 2/2002 | Gonzalez et al. ............. 705/28 |
| 2002/0059415 A1 | * | 5/2002 | Chang et al. ................ 709/223 |
| 2002/0063887 A1 | * | 5/2002 | White ....................... 358/1.15 |
| 2002/0078160 A1 | * | 6/2002 | Kemp et al. ................. 709/208 |
| 2005/0280864 A1 | * | 12/2005 | Lodwick .................... 358/1.15 |

FOREIGN PATENT DOCUMENTS

| | | |
|---|---|---|
| EP | 0 838 774 | 4/1998 |
| EP | 1197841 A2 * | 4/2002 |
| JP | 3-008013 | 1/1991 |
| JP | 09-300737 | 11/1997 |
| JP | 10-154110 | 6/1998 |
| JP | 10-240457 | 9/1998 |
| JP | 10-340165 | 12/1998 |
| JP | 11-102267 | 4/1999 |
| JP | 11-272435 | 10/1999 |
| JP | 2000-141829 | 5/2000 |
| JP | 2000-148425 | 5/2000 |
| JP | 2000-155722 | 6/2000 |
| JP | 2000-298559 | 10/2000 |
| JP | 2000-298569 | 10/2000 |
| JP | 2000-298675 | 10/2000 |
| JP | 2000-32206 | 11/2000 |
| WO | 1998-40826 | 9/1998 |

OTHER PUBLICATIONS

Kinkos.com website, <http://www.kinkos.com>, (visited Nov. 21, 2000), 6 pages.

Japanese Office Action dated Oct. 1, 2007 issued during prosecution of Japanese counterpart application No. 2005-307632.

Japanese Office Action dated Jan. 7, 2008 issued during prosecution of Japanese counterpart application No. 2005-307632.

* cited by examiner

PRINTING OVER THE INTERNET

BACKGROUND OF THE INVENTION

1. Field of the Invention

The present invention relates to printing over the Internet. More specifically, the present invention relates to a print driver that renders print data into a printer definition language and packages the rendered print data for transport across the Internet.

2. Description of the Related Art

Submitting data over the Internet to a print shop for printing and submitting print data to a remote printer across the Internet have become increasingly popular. For instance, some computer users desire to submit print jobs over the Internet to a print shop to have the print job printed out. This may be the case where, for example, a computer user may not have a printer to print his work or, where he may have a printer, but it is not capable of producing the type of printout he wants. For instance, a user may have a black and white only printer but may want to print a color image, or he may want to print a large volume of printouts but does not want to expend his own printer and paper resources. In either case, one option available for the user is to submit the print job over the Internet to a print shop that has the capability of producing the desired printout.

One example of an Internet print shop is provided by Kinkos®. In a print shop approach such as Kinkos®, a user logs-on to the Kinkos® website and submits a print job so that it can be printed by the print shop. The file is first generated using an application (e.g. a word processing or spreadsheet) program.

After having saved the file in the application program, the user then activates a web browser application on his computer to access the Kinkos® website. In order to print over the Internet with the Kinkos® system, the user must first register with Kinkos® and provide identification information and payment information such as a credit card number. Alternatively, the user can register the first time he attempts to submit data for printing. To print a file, the user accesses the website and selects an option to submit a print job to Kinkos® for printing. The user is prompted to select the file he wishes to upload and is then prompted to select from the pricing and printing options provided by Kinkos®. Locating the file to be submitted is sometimes difficult, especially for users who are unfamiliar with the process of locating files stored in a computer. Once having selected the file and printing and pricing options, the web browser processes the file by encapsulating it in HTTP (Hypertext Transport Protocol) and transports it over the Internet to Kinkos®. After receiving the file, Kinkos® processes it using the appropriate application to print out the print job.

Currently, only Microsoft® Word, Microsoft® Excel, Microsoft® PowerPoint, Corel® WordPerfect, PostScript/EPS, Rich Text Format, Text File, Kinko's® File Prep KDF and Adobe Acrobat PDF formats are supported. Therefore, if the user creates a work in a format other than one of the foregoing, printing on the Kinkos® system is not available.

Therefore, printing using the Kinkos® system requires the user to activate an application (e.g. a web browser) other than the application in which the file was created in order to submit the print job for printing over the Internet by Kinkos®. Additionally, the print job is submitted to Kinkos® for processing in a format that requires Kinkos® to activate an application program that contains a print driver specific to a printer within the store, select the file and submit it for printing. Both steps, activating a web browser and activating an application at Kinkos®, require extra processing and make printing over the Internet cumbersome.

Another method of printing over the Internet is printing using the IPP (Internet Print Protocol). Some software programs are now being provided with IPP support. One example of such a software program is Microsoft® NT and Windows client/server. In order to print with IPP, a client application accesses the URL (Uniform Resource Locator) of a server that includes printers and print drivers. The client selects a printer from among those included at the server side and a print driver specific to the selected printer is installed on the client side. When a user wants to print over the Internet, the user selects a File/Print option within an application program which then activates the specific print driver. The print driver software processes the print data into a page description language supported by the specific printer and passes the data to the local spooler. The IPP client software then encapsulates the print data in HTTP and transfers the data to the URL of the server. Upon receiving the data, the IPP software on the server strips HTTP header information and passes the print data to the server side spooler for printing by the specific printer.

Thus, IPP provides a way for a user to submit a print job over the Internet from a print driver of an application program, but requires a second client software that supports IPP in order to submit the print job over the Internet.

Additionally, the print driver is specific for only one printer. If the user wants to submit a print job to a different printer, he must access the URL of the server supporting the different printer and install the print driver of that printer as well.

Therefore, what is needed is a print driver that is generic to all printer types, that converts print data into a printer definition language, and that can encapsulate the print data for transport across the Internet.

SUMMARY OF THE INVENTION

The present invention addresses the foregoing by providing a print driver accessible from within multiple applications that renders print data to be transmitted over the Internet into a printing definition language, and packages the rendered print data with a protocol for transmission over the Internet.

As a result, print jobs can be submitted for printing over the Internet directly from within an application program without having to separately activate a web browser application. Accordingly, printing over the Internet is facilitated and the time and effort involved in Internet printing is reduced.

Thus, according to one aspect, the invention prints over the Internet by a print driver, accessible by at least one application program, outputting print data for transmission over the Internet. The print driver receives a print request from an application program to print over the Internet, renders print data to be transmitted over the Internet into a printing definition language, and packages the rendered print data with a protocol for transmission over the Internet.

The print data may be rendered into a generic printer definition language not related to any specific printer type. Accordingly, the print data being transmitted over the Internet is not limited to a specific type of printer, but can be processed and printed by virtually any printer.

As a result, a single print driver can be utilized to submit print data over the Internet, without having to install separate print drivers for each printer type that a print job is to be submitted to.

In another aspect, the invention performs printing over the Internet by a transmitting node transmitting print data over the Internet, and a receiving node receiving the print data transmitted over the Internet by the transmitting node. The print data is transmitted over the Internet by a print driver executable in the transmitting node, the print driver being accessible by at least one application program and in response to a print request from the application program, (a) rendering the print data into a printing definition language, and (b) packaging the rendered print data with a protocol for transmission over the Internet.

In a further aspect, the invention prints over the Internet by transmitting print data over the Internet to a receiving device. A processor performs executable process steps, and a memory stores the executable process steps. The executable process steps comprise a print driver accessible by at least one application program that, in response to a print request from an application program, (a) renders print data into a printing definition language, and (b) packages the rendered print data with a protocol for transmission over the Internet.

The invention also performs printing over the Internet by a graphical user interface inputting information for printing over an Internet. The graphical user interface is provided in conjunction with a print driver that renders print data to be transmitted over the Internet into a printing definition language, packages the rendered print data with a protocol for transmission over the Internet, and transmits the packaged print data over the Internet, the graphical user interface comprising an interface for obtaining user information to be transmitted over the Internet to a service provider, and an interface for obtaining service provider information for which the print data is to be transmitted to over the Internet.

The service provider interface may provide a search option, wherein the print driver obtains service provider information from a service provider portal in response to selection of the search option.

The graphical user interface provides a way for the user to easily provide his personal user information for submitting the print job over the Internet, as well as an easy way for the user to obtain service provider information of available service providers for submitting the print job.

In yet a further aspect, the invention performs printing for pay over the Internet, by activating a print driver in a host computer, the print driver obtaining service provider information from a service provider portal, selecting at least one service provider from the obtained service provider information, providing user and payment information in the print driver, the print driver rendering print data into a printer definition language, the print driver packaging the rendered print data into an Internet transport protocol, and the print driver submitting the packaged print data to the at least one selected service provider via Internet. Service provider information may be obtained by selecting a provider information option within the print driver, providing search criteria for searching for service providers, the print driver submitting the search criteria to the service provider portal via the Internet, and the service provider portal obtaining service provider information of service providers meeting the search criteria and submitting the obtained service provider information to the print driver via the Internet. Additionally, after the rendering step and before the packaging step, the print driver may submit job ticket information to the service provider via the Internet, the service provider processes the job ticket information and submits a reply to the job ticket information to the print driver via the Internet, and based on the reply to the job ticket information, an option to submit the print job data to the service provider is selected.

This brief summary has been provided so that the nature of the invention may be understood quickly. A more complete understanding of the invention can be obtained by reference to the following detailed description of the preferred embodiment thereof in connection with the attached drawings.

DETAILED DESCRIPTION OF THE PREFERRED EMBODIMENTS

Figure 1:
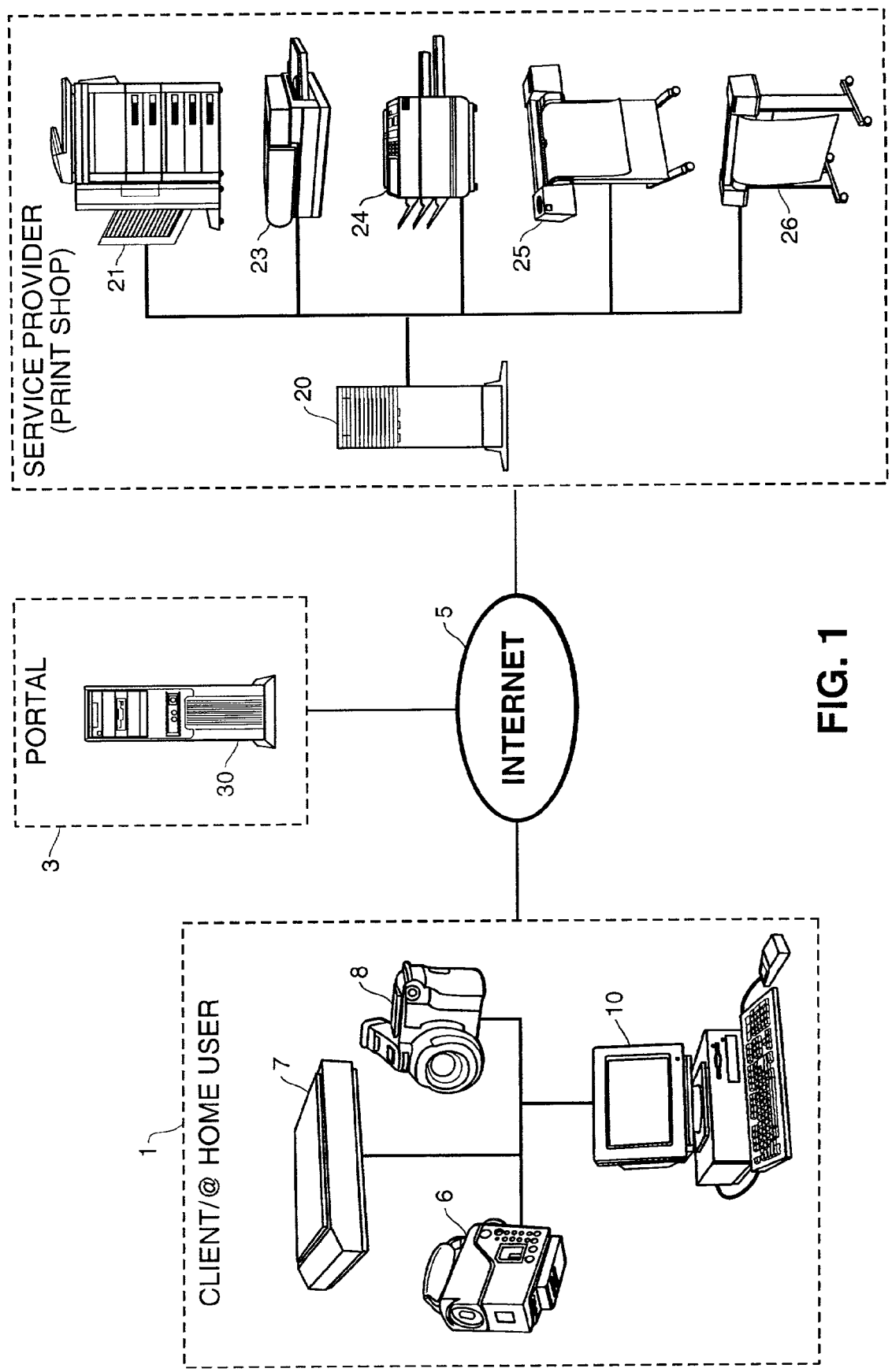
FIG. 1 is an overall system view depicting various components of an Internet printing system according to the invention.

FIG. 1 is an overall system view depicting various components of an Internet print-for-pay system. As seen in FIG. 1, the system may include three main components, client/@ home user 1, service provider 2 and portal 3. Each of these components are connected to and communicate with each other via Internet 5. Client/@ home user 1 communicates with service provider 2 to submit data to be printed by service provider 2. For instance, a user may not be able to print a print job at home for a number of reasons, such as not having a printer in their home, wanting to print a color printout but not having a color printer in their home, wanting to print hundreds or thousands of copies of a document and not being able to print such a large volume of print outs at home, or wanting a large volume of presentations printed near a conference center (to avoid large shipping cost and time) and having them delivered on site rather than having to carrying the presentations with them on the trip. In each of these cases, the user could submit the print job via Internet 5 from client/@ home user 1 to service provider 2 where the print job is processed and printed according to the user's request. The process of submitting such a request and the processing of the request will be described in more detail below.

Client/@ home user 1 preferably includes a computer workstation 10 which is connected to the Internet via a communication device such as a telephone line modem, a cable modem, a DSL modem or any other type of communication device that provides for communication via the Internet. Computer workstation 10 may be any type of computer workstation such as an IBM or compatible PC with a windows operating system. However, computer workstation 10 may also be a Macintosh workstation, a Sun Microsystems workstation, a Unix workstation or any other type of workstation that supports communication over the Internet. Computer workstation 10 also preferably provides a user with the ability to generate documents and/or images utilizing various application programs running in computer workstation 10. Additionally, the application programs running in computer workstation 10 preferably include a print option which allows the user to submit data generated in the application program for printing. As will be described in more detail below, when the print option is selected in the application program, a print driver is activated which processes a print request and submits the data for printing from client/@ home user 1 to service provider 2 via Internet 5. A more detailed description of the internal architecture of computer 10 is provided below with reference to FIG. 3.

Various peripheral devices may also be connected to computer workstation 10. For instance, video camera 6, scanner 7 and digital camera 8 may all be connected to computer 10 by, for example, a universal serial bus (USB) connection. Thus, utilizing various application programs within computer 10, a user can import photos or images from any of the various peripheral devices for insertion into their print job. The user can then submit the photos or images to service provider 2 for processing.

Service provider 2 may be a print shop such as Kinkos® or any other type of print shop that can receive and process print requests for pay. Service provider 2 is not limited to a print shop per se, but may be any provider that can receive and process print requests. For instance, service provider 2 may be a hotel that can receive and process print requests for pay over the Internet. As further examples, service provider 2 may be a post office, a kiosk in an airport or a mall, or a convention center. As can readily be seen, virtually any type of service provider could be employed in practicing the invention but for brevity, only a print shop such as Kinkos® will be discussed below.

As seen in FIG. 1, service provider 2 may include a server such as service provider server 20. Service provider server 20 may be any type of server such as a Compaq® ProSignia® server but need not be a server per se. Rather, service provider server 20 merely needs to provide the ability to communicate with various devices over the Internet and include an Internet identification designation that identifies the device as an Internet server. That is, service provider server 20 is connected to Internet 5 and receives queries and print requests transmitted via Internet 5 and returns responses to the queries and print requests via Internet 5 to the corresponding device. A more detailed description of the functionality of service provider server 20 is provided below.

Service provider 2 also preferably includes various types of printing devices for processing print requests. For example, service provider 2 may include a combined printer/copier 21, color printer 23, black and white printer 24, color plotter 25 and black and white plotter 26. Of course, these are merely examples of some of the printing devices that may be included in service provider 2 and numerous other devices may also be included.

Service provider 2 may also include other equipment which, for simplicity, is not depicted in FIG. 1. For example, service provider 2 may include various equipment for performing finishing processes of print requests. That is, a user may submit a print request to have the print job bound with a specific type of binding. As such, if service provider 2 has the ability to perform such a finishing request, then the necessary equipment for performing the finishing request would be included in service provider 2. As can readily be understood, numerous types of finishing option may be provided for and therefore, for simplicity, the equipment for performing such operations has been omitted from FIG. 1.

As described above, an unlimited number of service providers could be employed in the system of FIG. 1. That is, there may be virtually an unlimited number of service providers worldwide who are part of the system of FIG. 1. One aspect of the invention is for a user to locate a service provider that they want to submit their print request to. In order to assist users in locating a service provider, the system of FIG. 1 preferably includes portal 3. Portal 3 is preferably a sole source of service provider information. That is, portal 3 preferably includes a database of service providers that is managed by a company, such as Canon Inc., that operates a print-for-pay network of service providers by having each service provider register as a member of the network. Once a service provider has registered as a member of the service provider network, there information is added to the database maintained by portal 3.

As seen in FIG. 1, portal 3 includes a server such as portal server 30. Like service provider server 20, portal server 30 may be a server per se, but need not be so. Portal server 30 is connected to Internet 5 and receives queries transmitted via Internet 5, processes the queries and transmits replies to the queries via Internet 5. One type of query that may be transmitted to portal server 30 is a query from client/@ home user 1 to obtain service provider information from portal 3 from which the user can select one or more service providers to submit a print request to. Upon receiving such a query, portal server 30 processes the query to retrieve service provider information that meets the query criteria contained in the database of registered service providers, and then transmits a reply to client/@ home user 1. This process will be described in more detail below.

Although FIG. 1 depicts an Internet environment, the invention is not limited to use in an Internet environment, but could be employed in any network similar to the Internet. Additionally, although FIG. 1 depicts three main components (client/@ home user 1, service provider 2 and portal 3), these are merely representative of some of the components utilized in practicing the invention and additional components could be employed in the network.

For instance, it can readily be understood that the invention could be employed in multiple clients/@ home users simultaneously since, as is presently the state of the Internet, millions of users are currently connected to and utilize the Internet every day. Additionally, although FIG. 1 depicts the invention as being implemented in a network with only one portal, it can readily be understood that multiple portals could be implemented in practicing the invention. Further, although FIG. 1 depicts service provider 2 as a print shop, as described above, virtually any type of service provider could be employed in practicing the invention. Thus, FIG. 1 merely depicts a simplified Internet environment utilized in practicing the invention but it can readily be understood that numerous variations to FIG. 1 could be made without departing from the spirit or scope of the invention.

Figure 2:
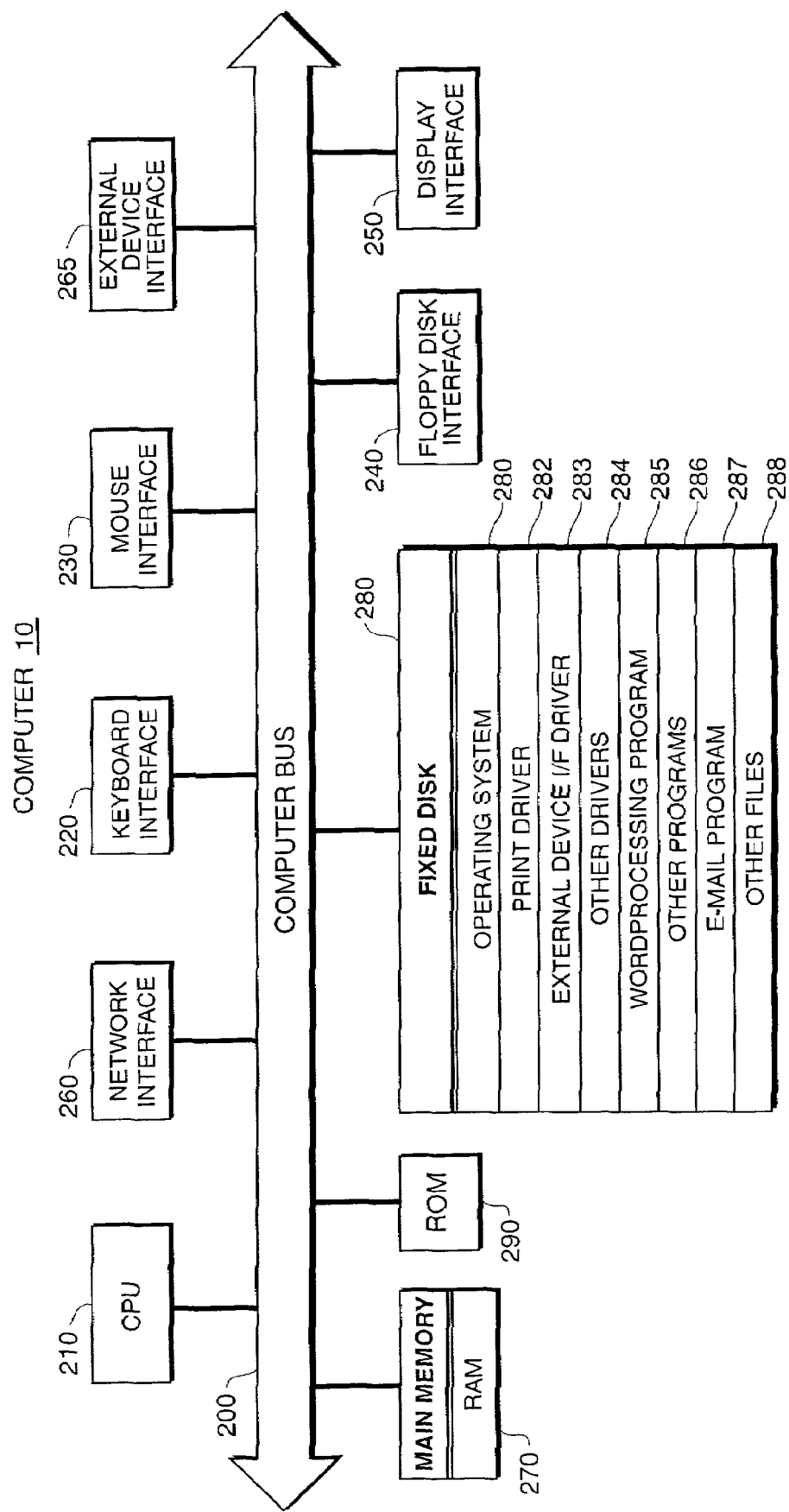
FIG. 2 is a block diagram of the internal architecture of a computer workstation.

FIG. 2 is a more detailed view of the internal architecture of computer workstation 10. As mentioned above, computer 10 may be an IBM or compatible PC or any of various other types of workstations. However, for the sake of brevity, only an IBM or compatible PC with a windows operating system will be discussed. In FIG. 2, computer 10 is seen to include central processing unit (CPU) 210 such as a programmable microprocessor which is interfaced to computer bus 200. Also coupled to computer bus 200 are keyboard interface 220 for interfacing to a keyboard, mouse interface 230 for interfacing to a pointing device, floppy disk interface 240 for interfacing to a floppy disk, display interface 250 for interfacing to a display, network interface 260 (such as a telephone line modem, cable modem, DSL modem or any other type of interface) for interfacing to Internet 5, and external device interface 265 (such as a USB connector) for interfacing to various external devices such as video camera 6, scanner 7 and/or digital camera 8.

Random access memory (RAM) 270 interfaces to computer bus 200 to provide CPU 210 with access to memory storage, thereby acting as the main runtime memory for CPU 210. In particular, when executing stored program instruction sequences, CPU 210 loads those instruction sequences from fixed disk 280 (or other memory media) into RAM 270 and executes those stored program instruction sequences out of RAM 270. It should also be noted that standard-disk swapping techniques available under windowing operating systems allow segments of memory to be swapped to and from RAM 270 and fixed disk 280. Read-only memory (ROM) 290 stores invariant instruction sequences, such as start-up instruction sequences for CPU 210 or basic input/output operation system (BIOS) sequences for the operation of peripheral devices attached to computer 10.

Fixed disk 280 is one example of a computer-readable medium that stores program instruction sequences executable by CPU 210 so as to constitute operating system 281, print driver 282, external device interface driver 283, other drivers 284, word processing program 285, other programs 286, e-mail program 287 and other files 288. As mentioned above, operating system 281 is preferably a windowing operating system, although other types of operating systems may be used with the present invention. Print driver 282 is utilized to prepare image data for printing on a local printer (not shown) or for submission of print data over the Internet to be printed by a service provider. Additionally, print driver 282 communicates via network interface 260 to query portal 3 for service provider information and to also submit a print job ticket over the Internet to service provider 2. Of course, print driver 282 also receives replies to a query from portal 3 and also receives replies to print job tickets submitted to service providers. These operations will be described in more detail below. External device interface driver 283 is utilized to drive and control external device interface 265 for interfacing with external devices. Other drivers 284 include drivers for each of the remaining interfaces which are coupled to computer bus 200.

Word processing program 285 is a typical word processor program for creating documents and images, such as Microsoft® Word, or Corel® WordPerfect documents. Other programs 286 contains other programs necessary to operate computer 10 and to run desired applications. E-mail program 287 is a typical e-mail program that allows computer 10 to receive and send e-mails over Internet 5. Other files 288 include any of the files necessary for the operation of computer 10 or files created and/or maintained by other application programs on computer 10. For example, Internet browser application programs, such as Microsoft Internet Explorer or Netscape Navigator, may be included in other files 288.

Figure 3:
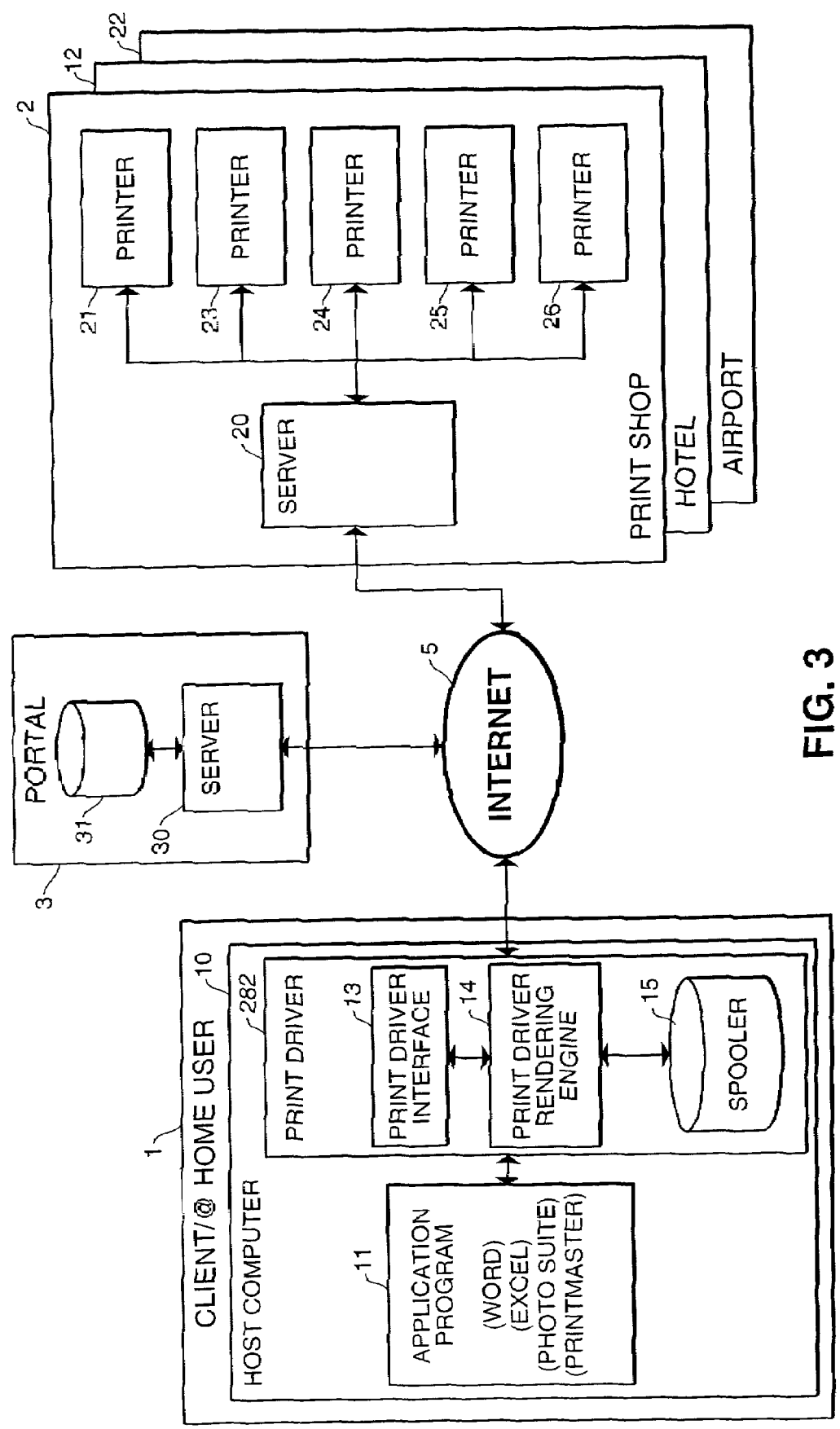
FIG. 3 depicts channels of communication between the various components of FIG. 1.

FIG. 3 depicts channels of communication between the various components of FIG. 1. As seen in FIG. 3, client/@ home user 1 includes computer workstation 10. As stated above, computer 10 includes application programs such as wordprocessing program 285 and other programs 286. For a general representation of the various application programs, FIG. 3 depicts application program 11 included within computer 10. Also as stated above, computer 10 includes print driver 282. As shown in FIG. 3, print driver 282 communicates with portal 3 and service provider 2 via Internet 5. Of course, other application programs in computer 10 could also communicate with various devices on Internet 5, but for simplicity, FIG. 3 only depicts print driver 282 communicating via Internet 5.

FIG. 3 also depicts print driver interface module 13, print driver rendering engine 14 and print spooler 15 as component parts of print driver 282. However, as those skilled in the art readily recognize, these are not the only modules or components that make up a print driver and other modules or components may also be included as part of print driver 282. However, for simplicity, the discussion that follows focuses on these modules or components.

In FIG. 3, print driver interface 13 and print driver rendering engine 14 communicate with each other and print driver rendering engine 14 also communicates with print spooler 15. Print driver interface 13 provides a graphical user interface that is displayed on a display connected to computer 10 when print driver 282 is activated. For instance, upon selecting a print option within an application program, print driver 282 is activated and print driver interface 13 displays a window, such as window 60 shown in FIGS. 6A and 6B. A more detailed description of window 60, as well as other windows that may be displayed upon selection of various options within window 60, will be provided below.

Upon selection of a print button in window 60 by a user, print driver rendering engine 14 performs various operations to render the print job into a format suitable for printing and for transport across the Internet to a selected service provider. As will be described in more detail below, one operation performed by rendering engine 14 is to submit a job ticket request via Internet 5 to service provider server 20 and to receive a response to the job ticket from service provider server 20. Then, if the user confirms the job request, print driver rendering engine 14 submits the rendered print data to service provider server 20 for printing.

Print driver 282 also includes print driver spooler 15 which spools (or stores) the rendered print data that is to be submitted for printing to the service provider. Additionally, as will be described below, the spooler performs an operation to calculate the number of pages to be printed and returns this information to rendering engine 14. When rendering engine 14 submits the job ticket to service provider server 20, part of the job ticket information is the number of pages calculated by the spooler. The service provider server utilizes this information to determine the cost of the print request and to return the cost information to the print driver. This process of rendering engine 14 processing a print job and communicating with service provider server 20 will be described in more detail below.

Also depicted in FIG. 3 is portal server 30 communicating with devices via Internet 5 and also communicates database 31. Database 31 is preferably a database of service providers maintained by portal 3. Although database 31 is depicted as being external to portal server 30, database 31 may be contained on a fixed disk within portal server 30. Portal server 30 communicates via Internet 5 to receive queries from print driver 282 and to provide replies to the queries. That is, as will be described in more detail below, portal server 30 receives queries for service provider information from print driver 282 via Internet 5 and returns a reply to print driver 282 via Internet 5.

Service provider server 20 depicted in FIG. 3 also communicates via Internet 5 with other devices on the Internet. As stated above, service provider server 20 receives job ticket information from print driver 282 and returns a reply that includes a job identification number and cost information. After the user at computer 10 confirms the job ticket, printer driver 282 transmits the print job data to service provider server 20. As will be described in more detail below, upon receiving the print job data, service provider server 20 processes and stores the data until an operator at service provider 2 processes the job request. Service provider server 20 also communicates with various devices within service provider 2, such as printers 21, 23, 24, 25 and 26. Of course, service provider server 20 could also communicate with other devices within service provider 2 such as computer workstations. As stated above, service provider 2 is not limited to a print shop but may also be a hotel 12 or a kiosk in an airport 22.

Figure 4:
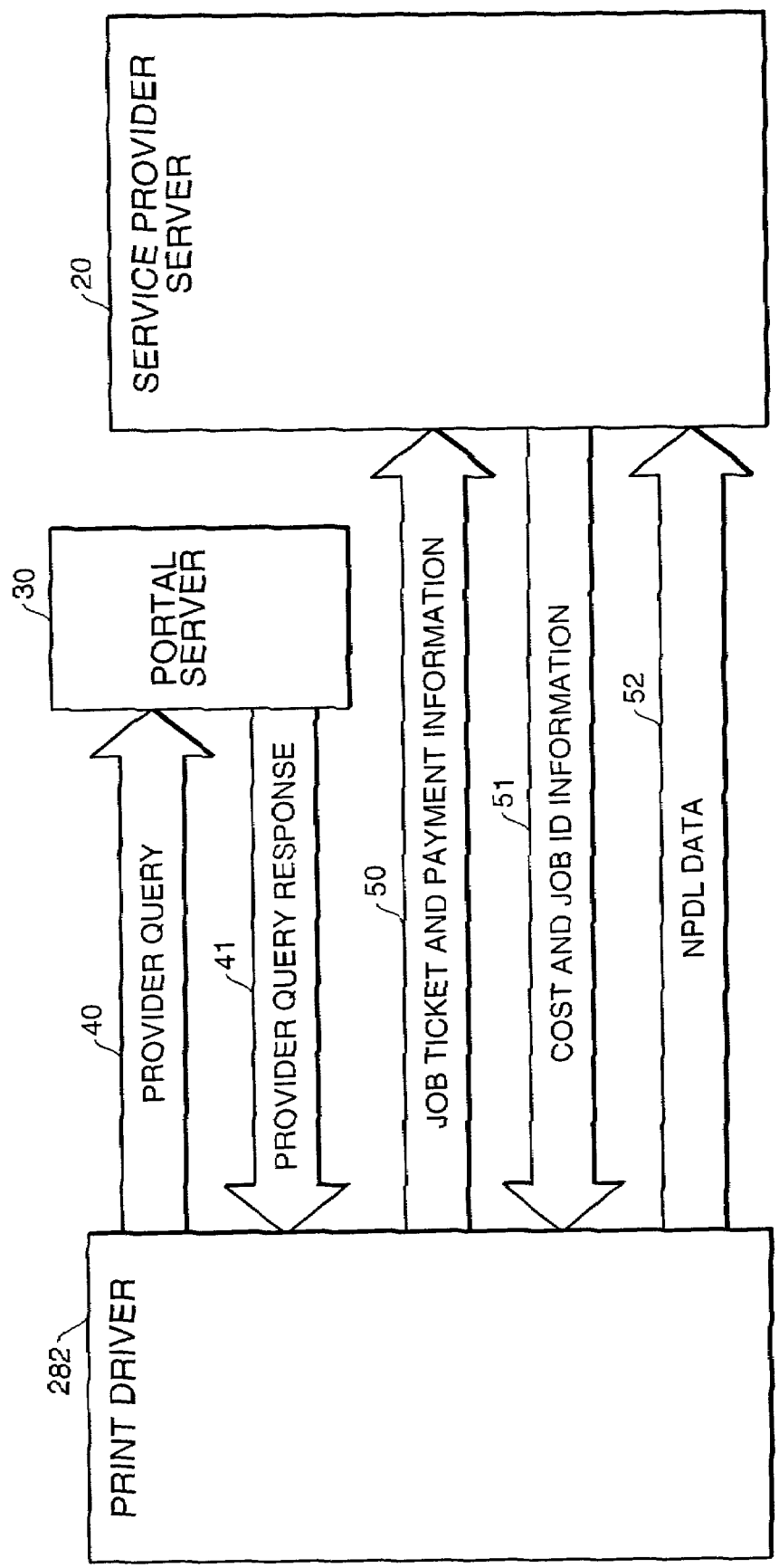
FIG. 4 depicts a sequence of communication over the Internet between the various components of FIG. 3.
Figure 6A:
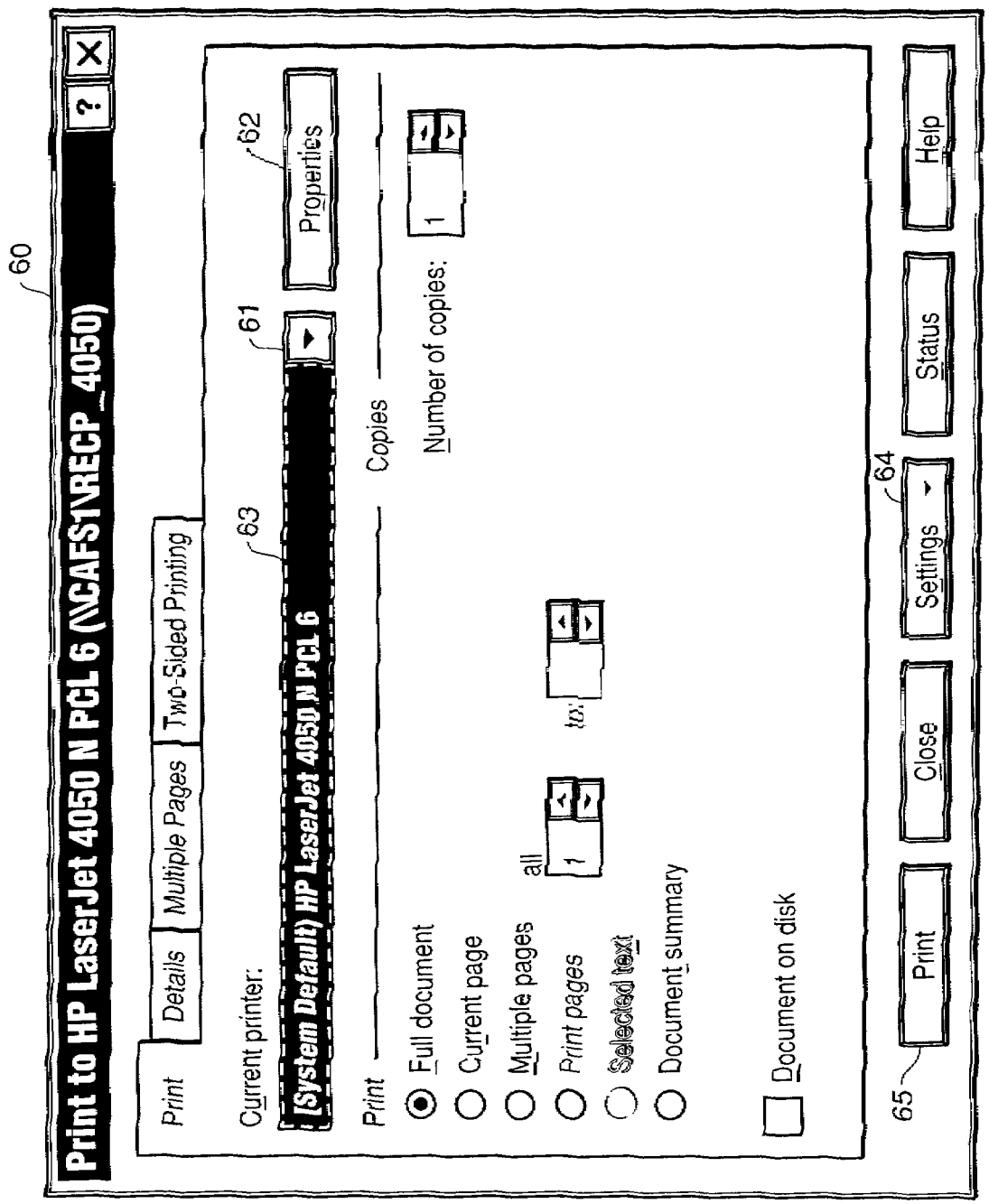
FIGS. 6A and 6B depict a window displayed as part of a graphical user interface (GUI) in a print driver upon selection of a print option within an application program.
Figure 6B:
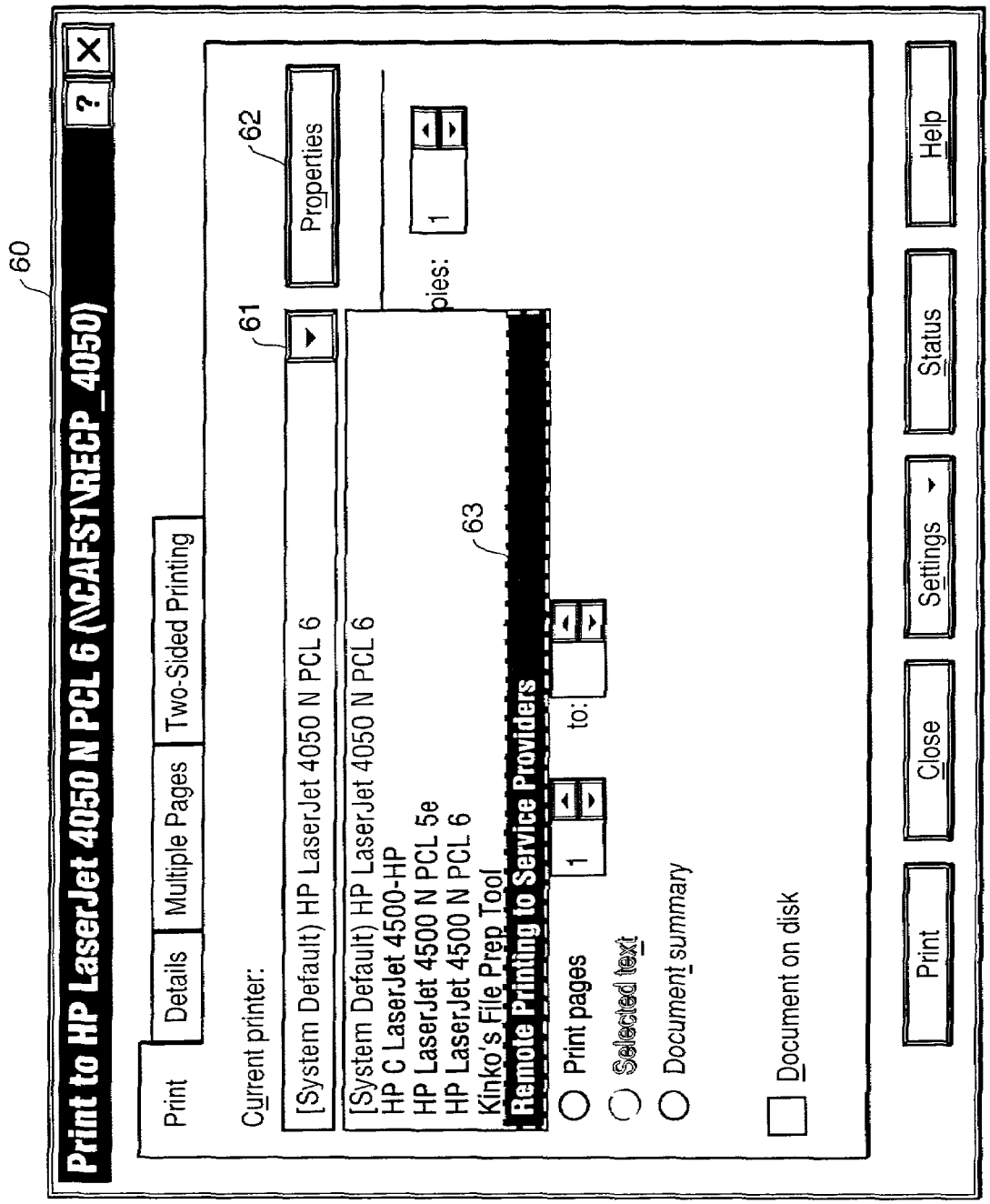

FIG. 4 depicts a more detailed flow of communication between print driver 282, portal server 30 and service provider server 20. A provider query request 40 is transmitted from print driver 282 to portal server 30 via Internet 5. Provider query request 40 is initiated by a user at computer 10 selecting a print option within an application program. Upon selecting the print option, print driver 282 is activated and print driver interface 13 displays window 60 as shown in FIG. 6A on a display of computer 10. In window 60 of FIG. 6A, the user is provided with the option of selecting the current printer (with the currently selected printer shown in box 63). To select a different printer, and in accordance with the invention, in order to select the option to print to remote service providers, the user clicks on scroll arrow 61 using a pointing device. Upon selecting scroll arrow 61 as seen in FIG. 6B, current printer box 63 expands to list all of the current printers installed on the computer. In FIG. 6B, one type of printer installed in computer 10 is Remote Printing To Service Providers. To select this option, the user highlights and clicks on Remote Printing To Service Providers in box 63.

Figure 7:
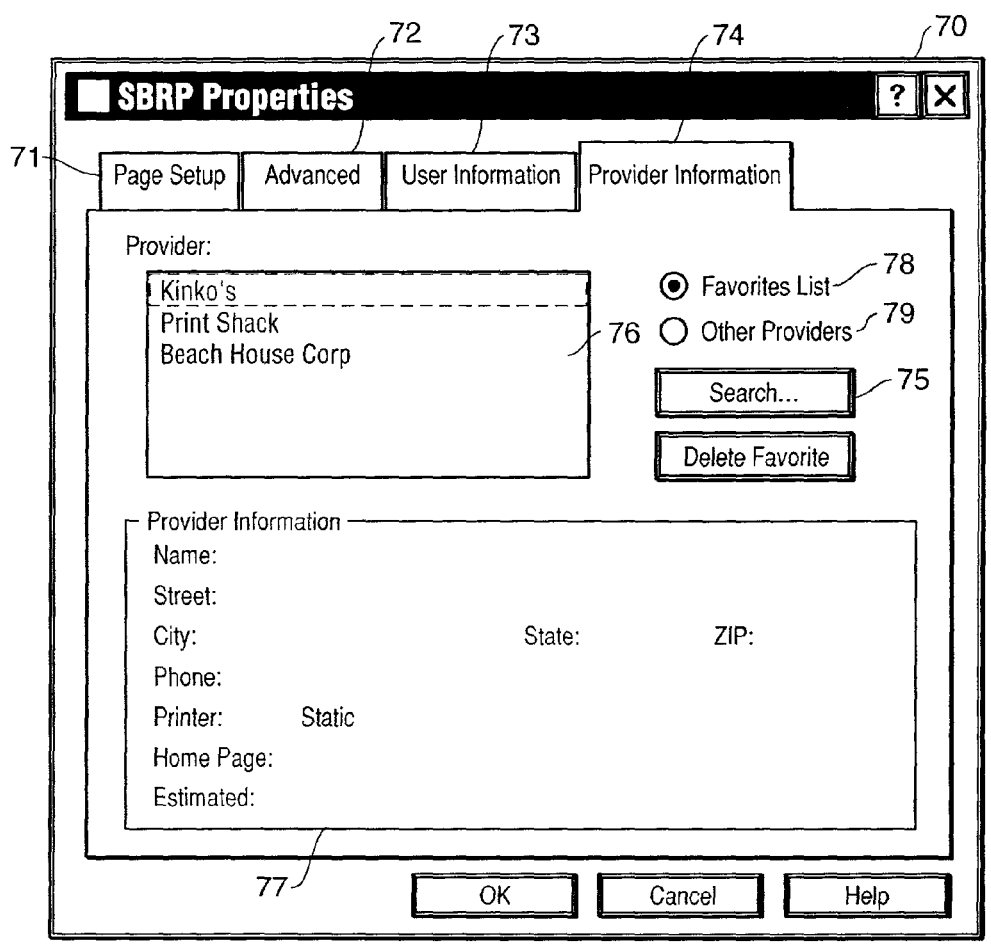
FIG. 7 depicts a remote printing properties window with a Provider Information tab selected and displayed as part of a GUI in a print driver according to the invention.

Once the user selects Remote Printing To Service Providers as the current printer, the user clicks on properties button 62 with the pointing device. Upon selecting properties button 62, remote printing properties window 70 as seen in FIG. 7 is displayed by print driver interface 13 on the display of computer 10. As seen in FIG. 7, remote printing properties window 70 includes Page Setup tab 71, Advanced tab 72, User Information tab 73 and Provider Information tab 74 (shown as the currently selected tab in FIG. 6B). In order to select a service provider, the user could select Favorites List button 78, which lists favorite providers in box 76 that the user can then select from. Once the user selects a service provider from the list in box 76, the service provider information is provided in box 77 and the user can select the OK button to confirm their service provider selection. Upon clicking the OK button, the remote printing properties window 70 closes and window 60 is again activated by print driver interface 13.

Referring again to FIG. 7, rather than a user selecting Favorites List button 78, the user could select Other Providers button 79. Upon selecting Other Providers button 79, search button 75 becomes active (currently shown as being inactive or ghosted out) and the user can click on search button 76 to begin entering search criteria. When the user selects search button 75, print driver interface 13 activates provider search window 80 as shown in FIG. 8.

Figure 8:
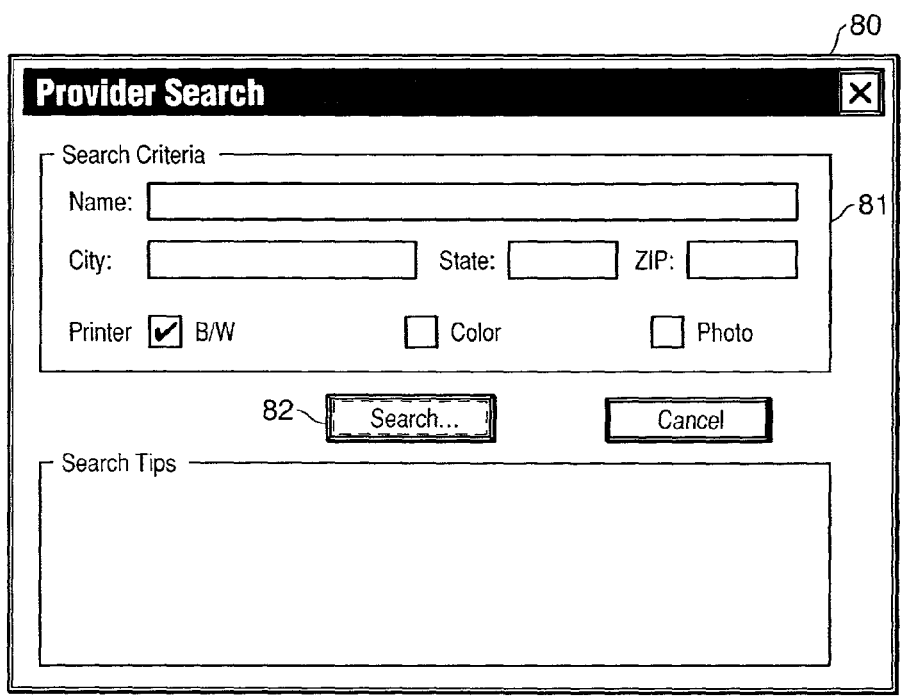
FIG. 8 depicts a provider search window displayed as part of a GUI in a print driver according to the invention.

As shown in FIG. 8, provider search window 80 includes Search Criteria box 81 in which the user enters information such as a service provider's name, city, state or zip code. The user may also enter a type of printer as a search criteria, such as black and white (B/W), color or photo. The foregoing criteria are not the only criteria that can be included in Search Criteria box 81, but are merely representative of some of the search criteria that could be included and as can readily be understood, other criteria could also be included. Additionally, it is not necessary that the user enter information in each of the fields shown in Search Criteria box 81. For instance, the user may not know the name of the provider but may want to find all providers in a particular city. Accordingly, the user may only provide city and state information in box 81. Of course, when the user enters more search criteria, a narrower search occurs and less service providers are likely to be found to meet the criteria. Likewise, if the user enters very little search criteria information in box 81, the list of service providers obtained may be too large and the user may receive a failure message, together with a request to perform a narrower search. For instance, if the user only provides printer information such as that shown in FIG. 8, the results of a search will obtain a listing of all service providers around the world who can process a black and white print job. As can readily be seen, if service provider portal 3 includes a database of hundreds of thousands of service providers worldwide that can process black and white print jobs, the listing may be too large for the print driver to display and the user may be requested to narrow the search by providing additional search criteria. Once the user has provided the search criteria in box 81, search button 82 is activated and the user can click on search button 82 to begin the service provider search process.

Upon selecting search button 82, print driver 282 submits service provider query 40 to portal server 30 via Internet 5 as shown in FIG. 4. Service provider query 40 includes the search criteria provided by the user in Search Criteria box 81 and also includes a request for portal server 30 to reply to the query by submitting a reply to the Internet address of computer 10. In order for print driver 282 to submit the query to portal server 30, print driver 282 is configured with the Internet address of portal server 30 when the Remote Printing To Service Providers print driver is installed. Of course, printer driver 282 could be setup with a different portal address anytime after the driver is installed by selecting settings button 64 shown in FIG. 6A.

Upon receiving service provider query 40 from print driver 282, portal server 30 processes the request and obtains service provider information that meets the search criteria provided by the user in box 81 from database 31. Portal server 30 then replies to the query with provider query response 41 as shown in FIG. 4. Provider query response 41 includes a list of service providers who meet the criteria specified by the user in box 81, together with their associated information, and also may include an estimated cost of performing various printing services. The list of service providers is displayed by print driver interface 13 on the display of computer 10. The user can then select one or more of the service providers from the list, whereby print driver interface 13 again activates and displays Remote Printing To Service Providers window 70 with the selected service provider information displayed in box 77. To confirm the selected service provider, the user selects the OK button in window 70, whereby Remote Printing To Service Providers properties window 70 is closed and print driver interface 13 again activates and displays window 60. Upon returning to window 60 after selecting a service provider, if the user selects print button 65 at this time, his print request will be denied by the service provider because the print request does not include the needed billing information, such as the user's name, payment information, delivery type, etc. Therefore, before the user's print request is accepted by the service provider, the necessary billing information needs to be included with the print request.

One way that the billing information could be included with the print request is to automatically set the billing information in the print driver settings. That is, by selecting print driver settings button 64 in window 60, default billing information could be set in the print driver and therefore, the user would not be required to enter the billing information each time he submitted a print request. However, this is not the preferred embodiment since this raises security concerns.

Figure 9:
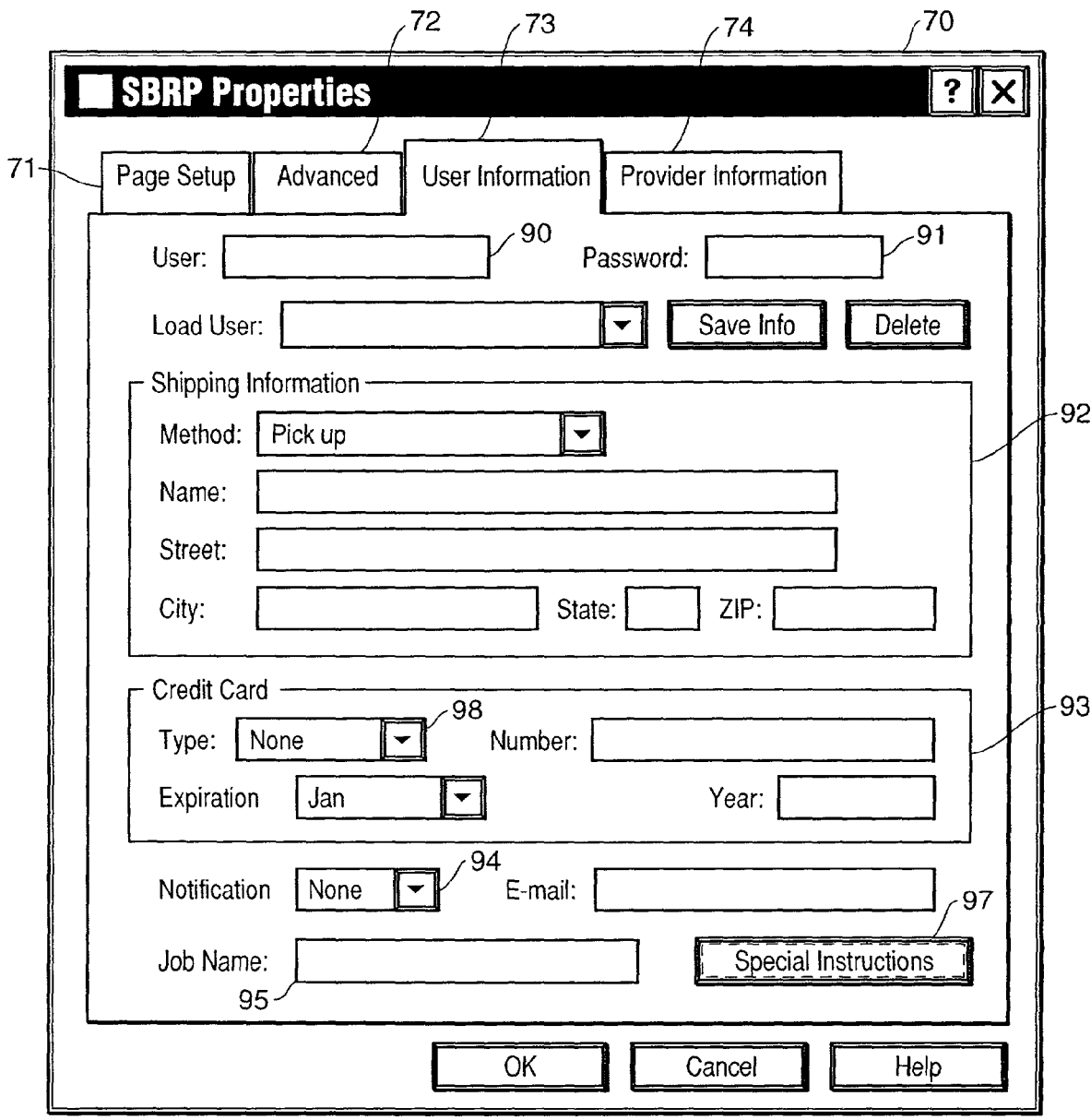
FIG. 9 depicts a remote printing properties window with a User Information tab selected and displayed as part of a GUI in a print driver according to the invention.

Another way would be for the user to select properties button 62 in window 60, which activates properties window 70, and then select User Information tab 73 in window 70. FIG. 9 depicts remote printing to service providers properties window 70 with user information tab 73 selected. As seen in FIG. 9, User Information tab 73 includes box 90 to provide the user's name, and box 91 to provide the user's password (if necessary). Shipping information box 92 is also provided in window 70 for the user to select the type of delivery. The user could select from among various methods of delivery including pick-up, first class mail, overnight mail, express mail, United Parcel Service, etc. As shown in FIG. 9, if the user selects pick-up as the method of shipping, the user would not need to enter mailing address information (i.e. name, street, city, etc. are ghosted out). If however, the user selected first class mail as the method of delivery, then the user would need to enter the addressee information in box 92.

Also provided for in User Information tab 73 is box 93 for the user to enter payment type information. In box 93, the user can select scroll arrow 98 and select a credit card type such as Visa, Mastercard, American Express, Discover, etc., and provide the card number and expiration date. Scroll arrow 98 may also provide a listing of other payment options such as cash on delivery (COD), or billing account number or customer number if the user has an established credit account with the service provider. Of course the invention is not limited to credit cards and any type of payment option could be provided for. For instance, if computer 10 includes a card swipe device similar to an ATM machine, or a device that accepts cash payments and provides a credit based on the cash payment, such a device could also be used to practice the invention.

As seen in FIG. 9, User Information tab 73 may also include an option to select a type of notification. The notification could be a confirmation of receipt of the print request or notification that the order has been completed, together with a shipping or delivery date, or if pick-up delivery was requested, a notification that the order is ready to be picked up. The notification type could be by telephone, email, voice mail, electronic page, courier mail, or any other type of notification.

User Information tab 73 may also provide for the user to include a job name or special instructions button 97 for the user to provide any special instructions. For instance, the user may want to request some type of special processing not included in the print driver tabs, such as a color of paper or a type of finishing not otherwise provided for. Whatever special instructions the user may want to request, they could be provided by the user selecting special instructions button 97. Once the user has provided the requisite information in User Information tab 73, the user can select the OK button in window 70, thereby returning to window 60 of FIG. 6A.

After the user has selected a service provider and entered the requisite user information as described above, he can select print button 65 in window 60 to submit the print request to the service provider. When the user selects print button 65, print driver rendering engine 14 is activated to render the print job into a neutral printer definition language (NPDL) and spool the print job data. The neutral printer definition language is preferably a language that is not specific to any particular type of printer. For instance, some print drivers render the print data into a printer definition language that is specific to the selected printer, such as PostScript or PCL (Printer Control Language). However, in the present invention, the print job is not being submitted directly to a specific type of printer, but rather is being submitted to a server in service provider 2, whereby an operator at service provider 2 selects which printer in the print shop is to process the print job. If the print data were rendered into PostScript and the operator selected a printer which required PCL data, the print request would not be processed properly by the printer selected by the operator. Unless, of course, the server has the ability to convert PostScript print jobs into PCL print jobs before they are submitted to the printer. Therefore, to address this concern, the print driver of the present invention renders the print data into a neutral printer definition language (NPDL) and when the print job is to be processed at the print shop, the server in the print shop converts the print data rendered in NPDL into the appropriate printer definition language of the printer selected by the operator.

Although print driver rendering engine 14 is activated and renders the print job into NPDL and spools the data, it is not submitted to the service provider at this time. Rather, print driver 282 submits a job ticket request to service provider server 20 via Internet 5, shown as 50 in FIG. 4. That is, print driver 282 submits a job ticket that includes the user's information (including payment type), type of print job to be printed (black and white, color or photo, finishing options, etc.), and number of pages contained in the print job, to service provider server 20. As stated above, the number of pages is preferably calculated by the rendering engine when the print job is spooled. Of course, other methods of determining the number of pages of the print job could also be employed.

Upon receiving the job ticket and payment information 50 from print driver 282, service provider server 20 processes the job ticket to generate a job identification number and a cost of processing the job. In this regard, in processing the job ticket, service provider server 20 may determine that service provider 2 may not be able fill the requested job ticket. For instance, the user may have requested various special instructions (i.e. finishing options) that the service provider is not able to perform. In this case, service provider server 20 may determine that the job ticket can not be processed and therefore returns a message to this effect to print driver 282. If service provider server 20 determines that service provider 2 is able to fulfill the job ticket, then the server calculates a cost, and perhaps even an estimated completion date, based on the job ticket information and generates a job identification number for the job ticket. Service provider server 20 then responds to the job ticket with the cost and job ID information 51 and submits this information via Internet 5 to print driver 282.

While print driver 282 is waiting for a response to the job ticket from service provider server 20, the print job data remains spooled. That is, the print job data is not submitted to service provider server 20 as part of the job ticket, but rather, remains spooled in print driver 282. In this manner, if the user decides to cancel the print request, the print data will not be submitted to the service provider. Once print driver 282 receives response 51 from service provider server 20, print driver interface 13 displays a window or message on the display of computer 10 that provides the user with information contained in the response. For instance, if the response includes a job ID and cost information, this information may be displayed in the window. If the response includes a message that the service provider is not able to complete the order, a message to this effect may be provided in the window. Nonetheless, regardless of the message displayed, the user is requested to either confirm the order (i.e. confirm that the order is to be submitted to the service provider), or to cancel the order.

If the user confirms the order, then the rendered NPDL data is packaged in a transport protocol for transport via Internet 5 by printer driver 282 and is transmitted from print driver 282 to service provider server 20 (shown as 52 in FIG. 4). Preferably, the NPDL data is packaged in HTTP (Hypertext Transport Protocol) which is currently the most popular transport protocol utilized in communication via the Internet. However, any other suitable transport protocol that provides for communication via the Internet or a network like the Internet, could be utilized in keeping with the spirt and scope of the invention.

Upon receiving the NPDL print data, service provider server 20 stores the print data and waits for an operator to select a printer for processing the job. Of course, service provider server 20 could be setup to automatically process the print job data upon receipt and manual operator intervention would not be required.

Figure 5:
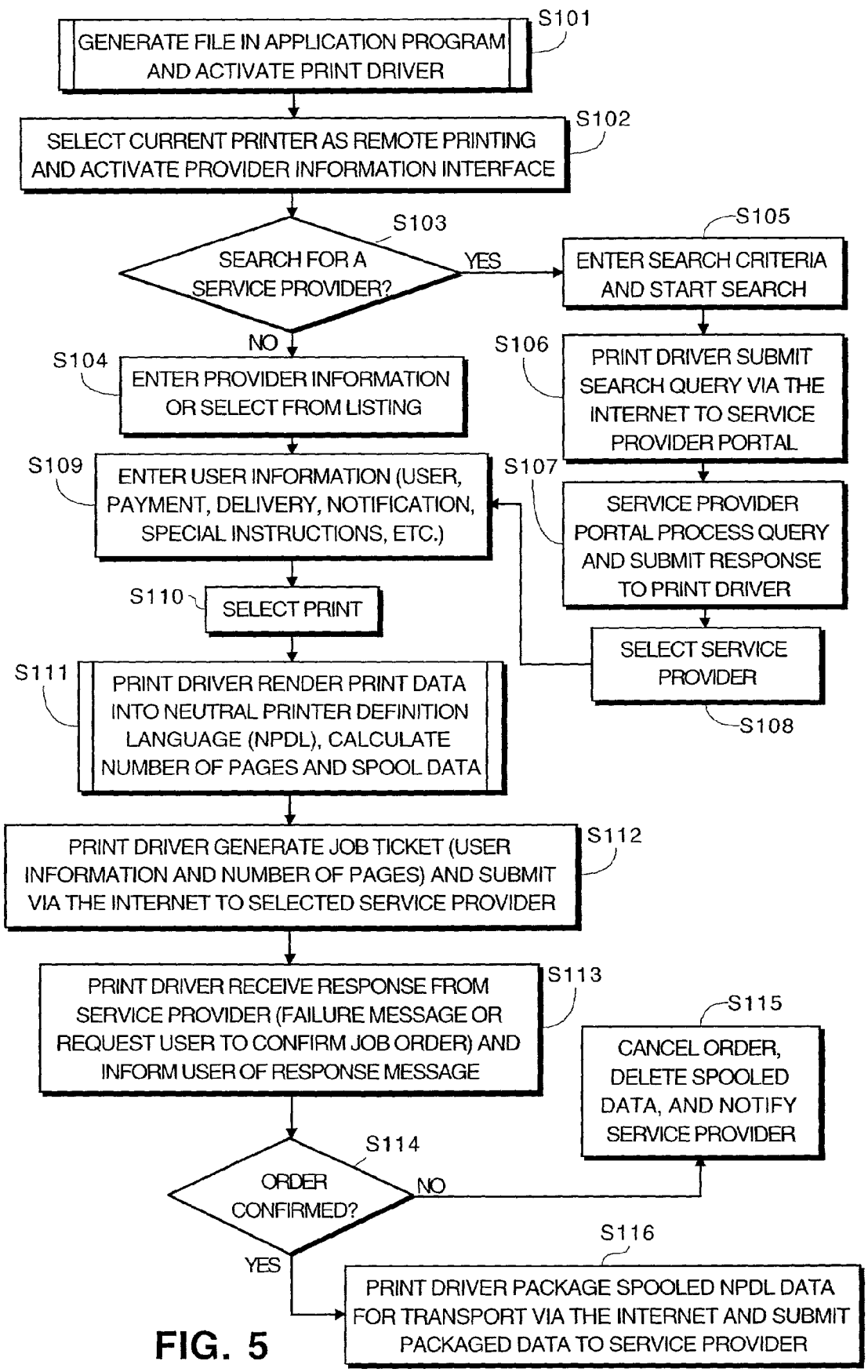
FIG. 5 depicts process steps for performing a print for pay over the Internet according to the invention.

FIG. 5 is a flowchart of process steps for submitting a print job to a service provider over the Internet according to the invention. Briefly, these steps comprise generating a file to be printed, activating a print driver, selecting a service provider to submit the print job to, providing user and payment information, submitting a job ticket to the selected service provider, receiving a job ID and cost information from the service provider, and submitting the print job to the service provider.

In more detail, in step S101, a user generates a document or image file using an application program. As stated above, any application program that generates files that can be printed can be utilized. While the application program is active, the user selects a print option within the application, thereby activating a print driver. The print driver displays a graphical user interface, such as window 60 shown in FIG. 6A.

In step S102, the user selects the current printer. As described above, for printing to a service provider over the Internet, the user clicks on scroll arrow 61 of window 60 and selects Remote Printing To Service Providers as shown in FIG. 6B. Once the user selects the remote printing option as the current printer, the user then selects properties button 62, thereby activating remote printing properties window 70 where the user selects Provider Information tab 74.

As this point in the printing process, the user selects a service provider that he wants to submit the print job to. In step S103, a determination is made whether the user has opted to search for a service provider. To select the option to search for a service provider, the user selects Other Providers button 79 shown in FIG. 7 and then selects search button 75, thereby activating provider search window 80 of FIG. 8. If the user selects this option, then flow proceeds to step S105. On the other hand, if the user already knows the service provider information, or if he wants to select a service provider from a list of providers already saved in the print driver (such as a list of favorites), then the user could select favorites button 78 and select a provider from the listing shown in box 76. If the user selects this option, then flow proceeds to step S109.

In a case where the user selects the option to search for a service provider (the YES branch of step S103), in step S105, the user enters the provider search criteria. As described above, the user enters any desired criteria in provider search window 80 and clicks on search button 82 to start the search. Upon clicking search button 82, the print driver submits the search query via the Internet to portal server 30 (step S106). Portal server 30 receives the query, processes it to obtain service provider information for service providers meeting the search criteria, and submits a response to the search query to the print driver (step S107). Once the print driver receives the response to the search query, the user selects a service provider from the search results (step S108), whereby flow then proceeds to step S109.

Once the user has selected a service provider (either in step S104 or via steps S105 to S108), in step S109 the user selects User Information tab 73, thereby bringing the User Information tab to the foreground of window 70 as shown in FIG. 9. As described above, the user enters information such as his name (box 90), password (box 91), shipping information (box 92), payment information (box 98), and any other information such as notification (box 94), job name (box 95), and email address (box 96). Additionally, the user can provide any special instructions by clicking on button 97.

Having selected a service provider and entered the user information, the user then selects the OK button in remote printing properties window 70 to close window 70 and return to window 60. Upon returning to window 60, the user clicks on print button 65 (step S110) to begin the process of submitting the print job to the service provider.

When the user selects print button 65, the print driver begins rendering the print job data into a neutral printer definition language and spools the data (step S111). Additionally, when the print data is spooled, the print driver calculates the number of pages based on the spooled data. As will be described below with regard to FIG. 10, the number of pages is utilized by the service provider server to calculate the cost of processing the print job and the cost information is provided back to the print driver for the user to confirm the print request.

Once the print data has been spooled, the print driver generates a job ticket and submits the job ticket via the Internet (preferably in HTTP) to service provider server 20 (step S112). As described above, the job ticket information includes the user information provided in step S109 and the number of pages calculated in step S111. The job ticket is received by the service provider server and processed to generate a response which is then transmitted via the Internet back to the print driver. This process is described in more detail below with regard to FIG. 10.

Upon receiving the response, the print driver processes the response and provides the user with a message indicating the contents of the response (step S113). The message may be a pop-up window which informs the user of a failure in the print request. That is, if the service provider is not able to fulfill the print request for any reason, service provider server 20 may return a failure message to the print driver and this message is displayed in the pop-up window for the user. If a failure message is received, the user would merely close the pop-up message window and the print request would be terminated. That is, the spooled print data would be deleted and will not be submitted to the service provider. However, if the response from the service provider server includes a job ID and cost information, this information is displayed in the pop-up window and the user is requested to confirm the print request (step S113). This provides the user with the option to cancel the print request if, for example, the cost is greater than he anticipated. Therefore, in step S114 a determination is made whether the user has confirmed the order or decided to cancel the print request. If the user cancels the request, then flow proceeds to step S115 where the spooled print data is deleted and the print request is terminated. If the user confirms the order, then flow proceeds to step S116 where the spooled NDPL print data is packaged for transport via the Internet (preferably in HTTP) and submitted via the Internet to the service provider server.

Figure 10:
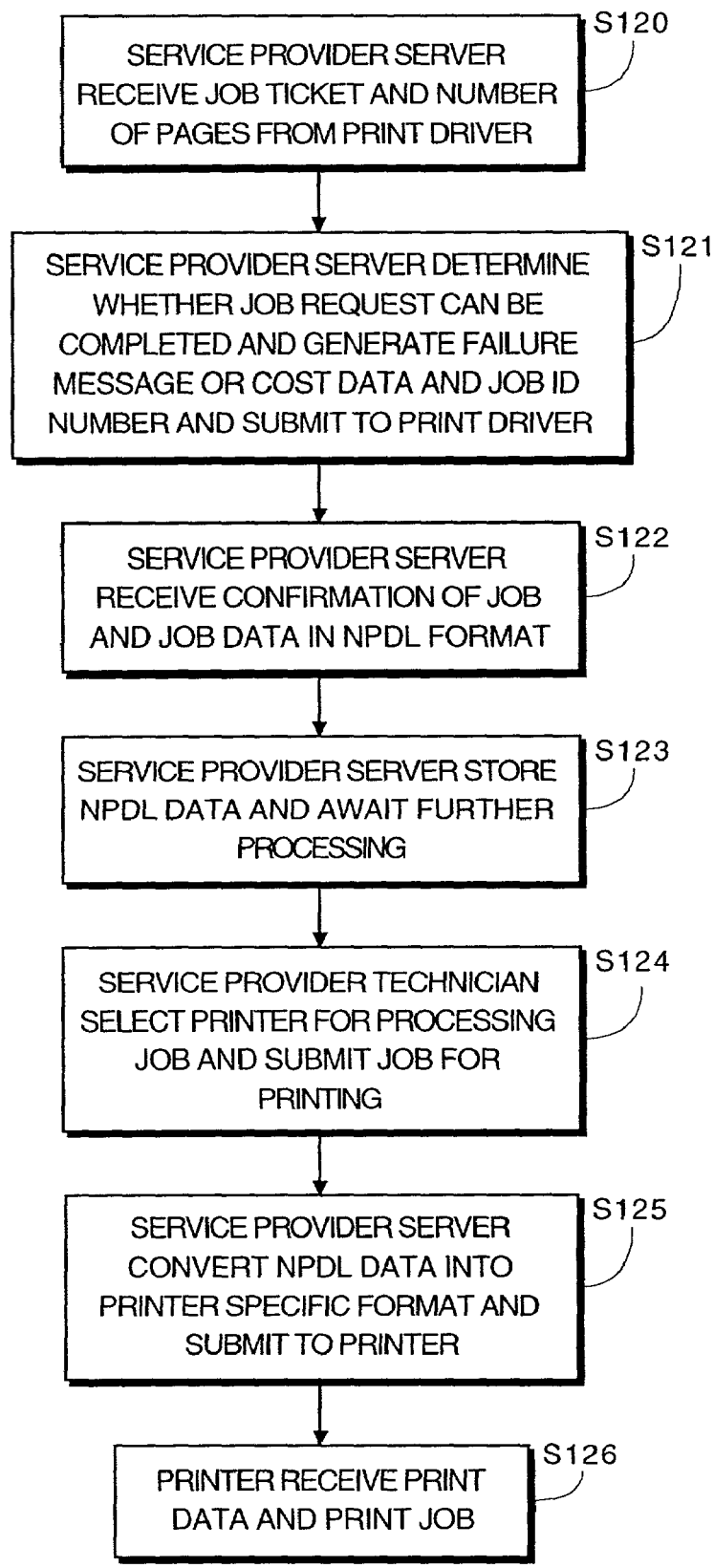
FIG. 10 depicts process steps for processing of a job request by a service provider.

FIG. 10 depicts process steps performed on the service provider side in processing a request for printing to a service provider over the Internet. In step S120, the service provider server receives the job ticket and number of pages information from the print driver (submitted in step 112 of FIG. 5). Upon receiving the job ticket, service provider server 20 first determines whether the print shop can process the print request. That is, the service provider server consults a look-up table that includes all of the various capabilities of the print shop and compares the job ticket information with the look-up table. Any options requested in the job ticket that are not found in the look-up table result in a failure message. Additionally, where special instructions are included in the job ticket, the service provider server may perform a boolean search of the words in the instructions in order to determine whether there are any special requests in the job ticket that the print shop is not able to perform. Of course, some special instruction requests may not be immediately detected as a failure in a boolean search and an operator who later reviews the print request may determine that the print shop is unable to process the request. In this case, the operator may submit a failure message to the printer driver at a later time. When a failure occurs, the service provider server generates a failure message and returns it as a response to the printer driver (step S121). The failure message may include an indication of which printing option they are not able to perform so that the user can submit a new request that does not include the failed option, if desired.

If however, the service provider server determines that the print shop is capable of processing the request, then the server generates a job identification number for the print request. Additionally, the service provider server utilizes the job ticket information (i.e. type of printing (color or black and white) and finishing options) and the number of pages to generate an estimated cost of processing the print request. The job identification information and the estimated cost are then submitted as a response to the print request to the print driver via the Internet (step S121).

After receiving the response from the service provider server (step S113 of FIG. 5), and if the user confirms the print request whereby the print data is submitted by the printer driver to the service provider (step S116 of FIG. 5), the service provider server receives the print data in step S122. Upon receiving the print data, the service provider server stores the print data and awaits further processing (step S123). of course, the service provider server could also be setup to automatically process the print job data upon receipt and begin processing the data rather than waiting for an operator to process the data. However, in the preferred embodiment, the print data is stored since the invention is preferably employed in a print shop environment having multiple printers and therefore it may be better for an operator to select the most appropriate printer for processing the print job.

Steps S124 to S126 are steps for processing the print job whereby an operator selects the printer that the print job is to be processed on (step S124), the service provider server converts the NPDL print data into a printer specific format based on the printer selected by the operator and submits the print data to the printer for printing (step S125), and the printer processes and prints the print job (step S126). Of course, any method for processing the print data received by the service provider server could be employed and steps S124 to S126 are merely representative of one method of processing the print data. Therefore, the present invention is not limited to the foregoing process steps and other steps could be utilized in practicing the invention.

The invention has been described with particular illustrative embodiments. It is to be understood that the invention is not limited to the above-described embodiments and that various changes and modifications may be made by those of ordinary skill in the art without departing from the spirit and scope of the invention.

What is claimed is:

1. A print driver program stored on a computer-readable medium, accessible by at least one application program which can edit document data, so as to output print data for transmission over the Internet, comprising:
   receiving a print request from an application program to perform printing via the Internet;
   generating print data to be transmitted over the Internet into a printer-independent printing definition language and spooling the generated print data;
   packaging the generated print data with a protocol for transmission over the Internet;
   a user inputting a search condition to search for a print service provider via a user interface of the print driver;
   searching for the print service provider by submitting, a search request corresponding to the search condition to an external server via a network;
   receiving print service provider information related to a print service provider which satisfies the input search condition from the external server in accordance with the search request via the network, the print service provider information representing at least one destination for which the printer-independent print data can be transmitted to over the Internet;
   displaying the received print service provider information which satisfies the input search condition on the user interface of the print driver;
   the user selecting, via the user interface of the print driver, a print service provider, which satisfies the input search condition displayed in the displaying step, that the print data is to be transmitted to;
   generating a job ticket comprising at least a number of pages of the print job to be printed, the number of pages being determined based on the spooling of the generated print data:
   transmitting the generated job ticket to the selected print service provider;
   in response to transmitting the generated job ticket, receiving, from the selected service provider, job ticket response information for the requested print job;
   displaying a message to the user via the user interface regarding the received job ticket response information; and
   in a case where the message requests that the user confirm that the print job is to be transmitted to the selected print service provider, transmitting the printer-independent print data to the selected print service provider when the user inputs a confirmation, and in a case where the user inputs a cancellation request, or in a case where the message indicates that the print service provider is not able to process the print job, cancelling the print job and deleting the spooled print data.

2. A print driver according to claim 1, wherein the print service provider information includes at least one service provider who has registered as a member of a service provider group.

3. A print driver according to claim 1, wherein the print service provider information is received by the print driver from a service provider portal.

4. A print driver according to claim 3, wherein the print driver communicates with the service provider portal over the Internet.

5. A print driver according to claim 1, wherein the print driver packages the generated print data for transmission with an HTTP protocol.

6. A print driver according to claim 1, wherein the printer-independent printer definition language is a generic printer definition language not related to any specific printer type.

7. A system for printing over the Internet, comprising:
a transmitting node for transmitting print data over the Internet; and
a receiving node of a print service provider for receiving the print data transmitted over the Internet by the transmitting node,
wherein, the print data is transmitted over the Internet by a print driver of the transmitting node which is accessible by at least one application program which can edit document data, wherein the print driver, in response to receiving a print request from an application program to perform printing via the Internet performs the steps of, (a) generating the print data into a printer-independent printing definition language and spooling the generated print data, (b) packaging the generated print data with a protocol for transmission over the Internet, (c) a user inputting a search condition to search for a print service provider via a user interface of the print driver, (d) searching for the print service provider by submitting, independently from a process of editing the document data in the application, a search request corresponding to the search condition to an external server via a network, (e) receiving print service provider information related to a print service provider which satisfies the input search condition from the external server in accordance with the search request via the network, the print service provider information representing at least one destination for which the printer-independent print data can be transmitted to over the Internet, (f) displaying the received print service provider which satisfies the input search condition on the user interface of the print driver, (g) the user selecting, via the user interface of the print driver, a print service provider, which satisfies the input search condition displayed in the displaying step, that the print data is to be transmitted to, (h) generating a job ticket comprising at least a number of pages of the print job to be printed, the number of pages being determined based on the spooling of the generated print data, (i) transmitting the generated job ticket to the selected service provider, (j) in response to transmitting the generated job ticket, receiving, from the selected service provider, job ticket response information for the requested print job, (k) displaying a message to the user via the user interface regarding the received job ticket response information, and (l) in a case where the message requests that the user confirm that the print job is to be transmitted to the selected service provider, transmitting the printer-independent print data to the selected print service provider when the user inputs a confirmation, and in a case where the user inputs a cancellation request, or in a case where the message indicates that the print service provider is not able to process the print job, cancelling the print job and deleting the spooled print data.

8. An apparatus for transmitting print data over the Internet to a receiving device, comprising:
a processor for performing executable process steps; and
a memory for storing the executable process steps, wherein the executable process steps are executed by a print driver accessible by at least one application program which can edit document data and, in response to receiving a print request from an application program to perform printing via Internet, execute the steps of (a) generating print data into a printer-independent printing definition language and spooling the generated print data, (b) packaging the generated print data with a protocol for transmission over the Internet, (c) a user inputting a search condition to search for a print service provider via a user interface of the print driver, (d) searching for a print service provider by submitting a search request corresponding to the search condition to an external server via a network, (e) receiving print service provider information related to a print service provider which satisfies the input search condition from the external server in accordance with the search request via the network, the print service provider information representing at least one destination for which the printer-independent print data can be transmitted to over the Internet, (f) displaying the received print service provider which satisfies the input search condition on the user interface of the print driver, (g) the user selecting, via the user interface of the print driver, a print service provider, which satisfies the input search condition displayed in the displaying step, that the print data is to be transmitted to, (h) generating a job ticket comprising at least a number of pages of the print job to be printed, the number of pages being determined based on the spooling of the generated print data, (i) transmitting the generated job ticket to the selected service provider, (j) in response to transmitting the generated job ticket, receiving, from the selected service provider, job ticket response information for the requested print job, (k) displaying a message to the user via the user interface regarding the received job ticket response information, and (l) in a case where the message requests that the user confirm that the print job is to be transmitted to the selected service provider, transmitting the printer-independent print data to the selected print service provider when the user inputs a confirmation, and in a case where the user inputs a cancellation request, or in a case where the message indicates that the print service provider is not able to process the print job, cancelling the print job and deleting the spooled print data.

9. An apparatus according to claim 8, wherein the print service provider information includes at least one service provider who has registered as a member of a service provider group.

10. An apparatus according to claim 8, wherein the print service provider information is received by the print driver from a service provider portal.

11. An apparatus according to claim 10, wherein the print driver communicates with the service provider portal over the Internet.

12. An apparatus according to claim 8, wherein the print driver packages the generated print data for transmission with an HTTP protocol.

13. An apparatus according to claim 8, wherein the printer-independent printer definition language is a generic printer definition language not related to any specific printer type.

14. A computer-readable medium which stores computer executable process steps, the executable process steps being accessible by at least one application program which can edit document data, so as to output print data for transmission over the Internet, the executable process steps comprising:
receiving a print request from an application program to perform printing via the Internet;

generating print data to be transmitted over the Internet into a printer-independent printing definition language and spooling the generated print data;

packaging the generated print data with a protocol for transmission over the Internet;

a user inputting a search condition to search for a print service provider via a user interface of the print driver;

searching for a print service provider by submitting, a search request corresponding to the search condition to an external sever via a network;

receiving print service provider information related to a print service provider which satisfies the input search condition from the external server in accordance with the search request via the network, the print service provider information representing at least one destination for which the printer-independent print data can be transmitted to over the Internet;

displaying the received print service provider which satisfies the input search condition on the user interface of the print driver;

the user selecting, via the user interface of the print driver, a print service provider, which satisfies the input search condition displayed in the displaying step, that the print data is to be transmitted to;

generating a job ticket comprising at least a number of pages of the print job to be printed, the number of pages being determined based on the spooling of the generated print data;

transmitting the generated job ticket to the selected print service provider;

in response to transmitting the generated job ticket, receiving, from the selected service provider, job ticket response information for the requested print job;

displaying a message to the user via the user interface regarding the received job ticket response information; and in a case where the message requests that the user confirm that the print job is to be transmitted to the selected print service provider, transmitting the printer-independent print data to the selected print service provider when the user inputs a confirmation, and in a case where the user inputs a cancellation request, or in a case where the message indicates that the print service provider is not able to process the print job, cancelling the print job and deleting the spooled print data.

15. An apparatus which displays a graphical user interface of a print driver for inputting information for printing over an Internet, comprising:

a display unit that displays the graphical user interface of the print driver, wherein said graphical user interface of the print driver comprises;

an interface for a user to input a print request from an application program to perform printing via the Internet, wherein the print driver generates print data to be transmitted over the Internet into a printer-independent printing definition language and spools the generated print data, and packages the generated print data with a protocol for transmission over the Internet;

an interface for obtaining user information to be transmitted over the Internet to a print service provider;

an interface for inputting a search condition to search for a print service provider, the print driver searching for the print service provider by submitting, a search request corresponding to the input search condition to an external server via a network, the print driver receiving, print service provider information related to a print service provider which satisfies the input search condition from the external server in accordance with the search request via the network, the print service provider information representing at least one destination for which print data is to be transmitted to over the Internet;

an interface for displaying the received print service provider information which satisfies the input search condition on the user interface of the print driver;

an interface for selecting a print service provider from the displayed print service provider information, the print driver generating a job ticket comprising at least a number of pages of the print job to be printed, the number of pages being determined based on the spooling of the generated print data, the print driver transmitting the generated job ticket to the selected print service provider, the print driver receiving, in response to transmitting the job ticket, from the selected print service provider, job ticket response information for the requested print job; and an interface for displaying a message to the user regarding the received job ticket response information and for accepting input from the user in response to the displayed message, wherein, in a case where the message requests that the user confirm that the print job is to be transmitted to the selected print service provider, and the user inputs a confirmation in response to the message, the print driver transmitting the generated printer-independent print data to the selected print service provider, and in a case where the user inputs a cancellation request in response to the message, or in a case where the message indicates that the print service provider is not able to process the print job, the print driver cancelling the print job and deleting the spooled print data.

16. The apparatus according to claim 15, wherein the user information comprises at least one of user identification information, payment information, and shipping information.

17. The apparatus according to claim 15 further comprising an interface for obtaining special instructions regarding processing of the print data by the print service provider.

18. The apparatus according to claim 15, wherein the print service provider information comprises at least one of a service provider name, a service provider street address and a service provider Internet address.

19. The apparatus according to claim 15, wherein the print driver receives the print service provider information from a service provider portal in response to selection of a search option.

20. A computer executable method for transmitting print data over the Internet by a print driver which is accessible by at least one application program which can edit document data, so as to output the print data for transmission over the Internet, comprising the steps of:

receiving a print request from an application program to perform printing via the Internet;

generating print data to be transmitted over the Internet into a printer-independent printing definition language and spooling the generated print data;

packaging the generated print data with a protocol for transmission over the Internet;

a user inputting a search condition to search for a print service provider via a user interface of the print driver;

searching for a print service provider by submitting, a search request corresponding to the search condition to an external server via a network;

receiving print service provider information related to a print service provider which satisfies the input search condition from the external server in accordance with the search request via the network, the print service provider information representing at least one destination for which the printer-independent print data can be transmitted to over the Internet;

displaying the received print service provider information which satisfies the input search condition on the user interface of the print driver;

the user selecting, via the user interface of the print driver, a print service provider, which satisfies the input search condition displayed in the displaying step, that the print data is to be transmitted to;

generating a job ticket comprising at least a number of pages of the print job to be printed, the number of pages being determined based on the spooling of the generated print data;

transmitting the generated job ticket to the selected print service provider;

in response to transmitting the generated job ticket, receiving, from the selected service provider, job ticket response information for the requested print job;

displaying a message to the user via the user interface regarding the received job ticket response information; and in a case where the message requests that the user confirm that the print job is to be transmitted to the selected print service provider, transmitting the printer-independent print data to the selected print service provider when the user inputs a confirmation, and in a case where the user inputs a cancellation request. or in a case where the message indicates that the print service provider is not able to process the print job, cancelling the print job and deleting the spooled print data.

21. A print driver according to claim 1, wherein the job ticket further comprises user information of the user and a type of print job to be printed.

22. A print driver according to claim 1, wherein the job ticket response information comprises a job identification and a cost of completing the printing calculated by the selected print service provider, and the message displayed via the user interface displays the job identification and cost.

23. A print driver according to claim 1, wherein the job ticket response information comprises a message indicating that the selected service provider is not able to process the requested print job, and the message displayed via the user interface displays the same.

* * * * *